Sept. 6, 1927.

E. B. JACKSON

TIRE CARRIER

Filed Sept. 1, 1926

Elmer B. Jackson
INVENTOR

Patented Sept. 6, 1927.

1,641,890

UNITED STATES PATENT OFFICE.

ELMER B. JACKSON, OF BRAWLEY, CALIFORNIA.

TIRE CARRIER.

Application filed September 1, 1926. Serial No. 133,006.

The object of this invention is the provision of means for effectively supporting a spare tire beneath the body of an automobile or like vehicle.

A further object is the provision of means for this purpose wherein the spare tire is effectively supported and locked out of contact with any part of the vehicle, regardless of the vibration to which the vehicle is subjected and further wherein the spare tire may be easily and quickly arranged upon the supporting means therefor, and as easily and quickly removed therefrom.

To the attainment of the above recited objects and others which will present themselves as the nature of the invention is better understood, the improvement further resides in certain novel features of construction, combination and operative association of parts, a satisfactory embodiment of which is disclosed by the accompanying drawings.

Figure 1:
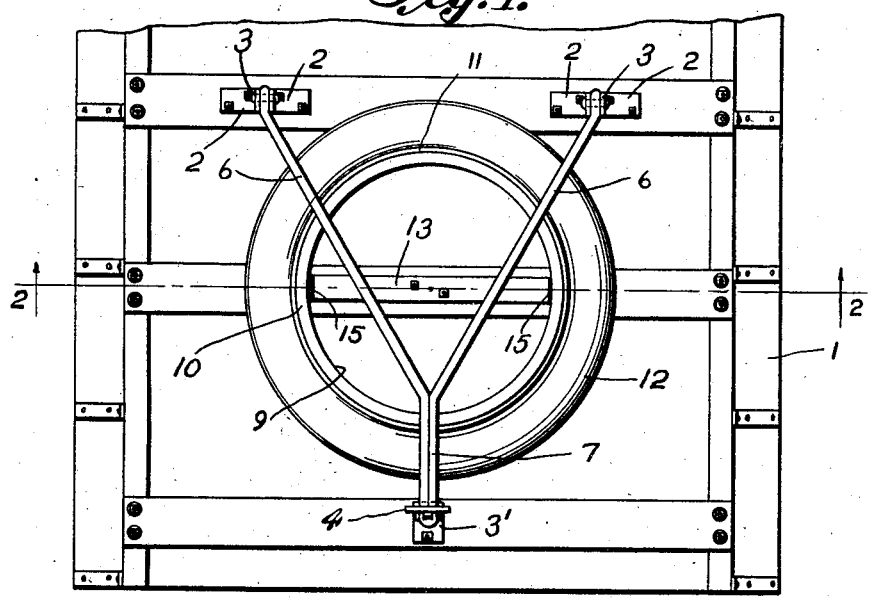
Figure 1 is a bottom plan view of a portion of the body of a vehicle illustrating the application of my improvement thereon.
Figure 2:
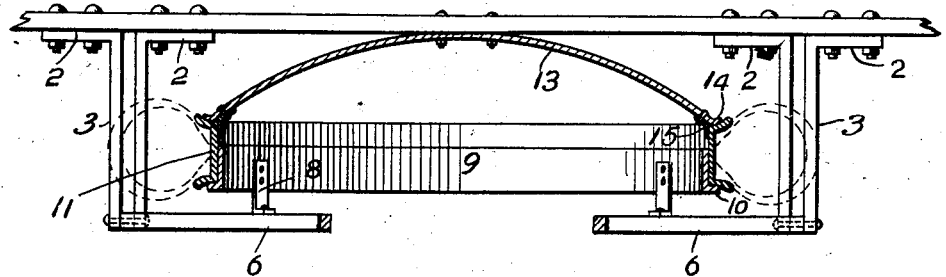
Figure 2 is a sectional view inverted with respect to Figure 1, and taken on the line 2—2 of said Figure 1.
Figure 3:
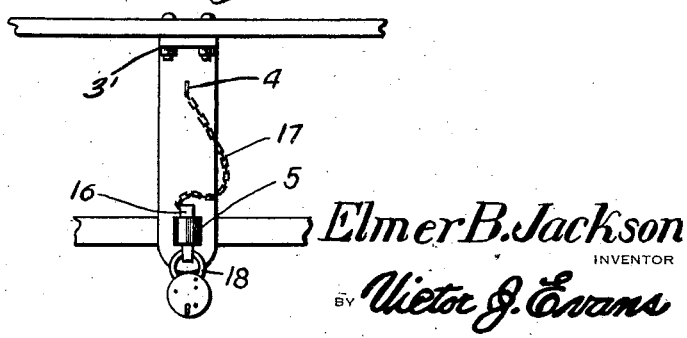
Figure 3 is a fragmentary end view to illustrate the manner in which the carrier is locked.

At a suitable point upon the under face of the vehicle body 1, preferably adjacent to the rear thereof, I secure a pair of spaced brackets 2 that have central depending portions 3 that are preferably bifurcated. As a matter-of-fact, each bracket 2 may comprise two angle members and such construction is illustrated by the drawings. Outward of the brackets 2 and disposed centrally between said brackets there is fixed on the bottom 1 of the vehicle a plate 3'. To the plate 3' there is hinged a hasp 4. The hasp 4 is provided, adjacent to its lower end, with a rectangular opening 5. The carrier includes a metal Y-shaped member, the angle arms 6 of which having straight extensions which are pivoted to the depending portions 3 of the brackets 2, and the central straight extension 7 of the said Y-shaped member is designed to be received through the opening 5 in the hasp 4. The angle arm 6 and the straight handle portions 7 of the Y-shaped member have fixed thereon outstanding lugs 8 to which is secured a ring 9, the said ring having an inner flange 10. This ring is designed to receive thereover and to have resting on the flange 10 thereof the rim 11 of a spare tire 12.

Having its center fixed to the under face of the body 1 of the vehicle there is an arched metal plate 13 which, of course, embodies a natural resiliency. This plate has its ends bent to provide beads 14 and inward of the beads there are secured on the plate angle fingers 15. The bead 14 and the fingers 15 are designed to contact with the side and inner face of the rim 11 opposite that engaged by the ring 9 and its flange 10.

It will be apparent that when the Y-shaped member is swung downwardly that the spare tire can be easily and quickly arranged on the rim. The Y-shaped member with the tire is then swung upwardly toward the body of the vehicle, so that the rim of the spare tire will be engaged by the bead or lips 14 and the fingers 15 of the arched spring plate 13. The hasp is then swung to receive the outer portion of the central element 7 of the Y-shaped member through the opening 5 thereof. The end of the part 7 is formed with a flared opening and through this opening there is passed a tapered pin 16 that is supported by a flexible element 17 on the staple 4. The pin has its reduced end provided with an opening that receives a locking element, such as the shackle of an ordinary lock 18, therethrough.

My improvement is of extremely simple construction and may be readily attached to any ordinary type of vehicles. With the improvement the spare tire may be readily supported and held from contact with any part of the vehicle, regardless of the vibration to which the vehicle is subjected. Thus injury to the spare tire is effectively prevented. By releasing the hasp the Y-shaped carrier may be readily swung downwardly and as a matter-of-fact will so swing by its own weight, so that the spare tire can be readily removed therefrom or a spare tire may be readily arranged thereon.

While I have illustrated a satisfactory embodiment of my improvement my features of invention are capable of extended application and I do not wish to be restricted to the specific structure herein shown and described.

Having described the invention, I claim:—

1. A spare tire carrier designed to be arranged on the bottom of a vehicle body, comprising a substantially Y-shaped member having its angle ends hingedly supported, a hasp for engaging the straight end of the member, means for locking the hasp to the member, a ring supported by the Y-shaped member and having a flanged end, and an arched spring member fixed to the vehicle body and having angle ends which are disposed opposite the flange of the rim.

2. A spare tire carrier designed to be arranged beneath a vehicle body, comprising spaced brackets secured to the bottom, a Y-shaped member having the ends of its angle arms pivotally secured to the brackets, a hasp hingedly secured to the body and having an opening therethrough to receive the straight end of the Y-shaped member therethrough, upstanding lugs on the Y-shaped member, a ring secured to said lugs and having its inner edge flanged outwardly, an arched spring centrally secured to the vehicle body and having angle ends which are disposed opposite the flange of the rim, a pin flexibly supported from the hasp designed to be passed through the straight end of the Y-shaped member and locking means for the pin.

In testimony whereof I affix my signature.

ELMER B. JACKSON.